United States Patent
Weisbarth et al.

(10) Patent No.: US 12,413,674 B2
(45) Date of Patent: Sep. 9, 2025

(54) INTELLIGENT CALL QUEUE PRIORITIZATION BASED ON VEHICULAR DATA RETRIEVAL

(71) Applicant: GM GLOBAL TECHNOLOGY OPERATIONS LLC, Detroit, MI (US)

(72) Inventors: Robert Weisbarth, New Boston, MI (US); Eric T. Hosey, Royal Oak, MI (US); Russell A. Patenaude, Macomb Township, MI (US); Matthew E. Gilbert-Eyres, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 18/096,043

(22) Filed: Jan. 12, 2023

(65) Prior Publication Data

US 2024/0244137 A1    Jul. 18, 2024

(51) Int. Cl.
  *H04M 3/523*  (2006.01)
  *G07C 5/00*  (2006.01)
  *G07C 5/08*  (2006.01)
  *H04M 3/428*  (2006.01)
  *H04M 3/51*  (2006.01)

(52) U.S. Cl.
  CPC .......... *H04M 3/523* (2013.01); *G07C 5/008* (2013.01); *G07C 5/0808* (2013.01); *G07C 5/0841* (2013.01); *H04M 3/4283* (2013.01); *H04M 3/5116* (2013.01)

(58) Field of Classification Search
  CPC .. H04M 3/523; H04M 3/4283; H04M 3/5116; H04M 2242/14; H04M 2242/15; H04M 3/5235; H04M 3/5232; G07C 5/008; G07C 5/0808; G07C 5/0841; G08B 25/016; H04W 4/90; H04W 76/50
  See application file for complete search history.

(56) References Cited

U.S. PATENT DOCUMENTS

| | | | |
|---|---|---|---|
| 6,542,808 B2 * | 4/2003 | Mintz | G08G 1/0133 340/934 |
| 6,754,335 B1 * | 6/2004 | Shaffer | H04M 3/523 379/266.02 |
| 6,791,473 B2 * | 9/2004 | Kibria | G08G 1/14 705/13 |
| 7,177,623 B2 * | 2/2007 | Baldwin | H04W 76/50 455/456.2 |
| 7,466,218 B2 * | 12/2008 | Oesterling | H04M 11/04 340/426.2 |

(Continued)

*Primary Examiner* — Lisa Hashem
(74) *Attorney, Agent, or Firm* — Quinn IP Law (57) ABSTRACT

A system and method for determining a priority of a call in an on-hold queue is presented. Determining a priority of a call is based on information received by an enterprise from a call from a vehicle with an integrated communication device where the call is placed into an on-hold queue to be answered based on its priority. Data from the vehicle with the integrated communication device includes at least a type of call, an account information associated with the vehicle, a vehicle data, and a location of the vehicle. The enterprise determines the priority of the call in the on-hold queue based on the data received from the vehicle with the integrated communication device.

18 Claims, 4 Drawing Sheets

(56) References Cited

U.S. PATENT DOCUMENTS

| | | | | |
|---|---|---|---|---|
| 8,749,350 | B2* | 6/2014 | Geisler | G07C 5/008 |
| | | | | 340/8.1 |
| 10,206,015 | B2* | 2/2019 | Sunadham | H04Q 9/00 |
| 12,245,123 | B2* | 3/2025 | Martin | H04W 4/12 |
| 2007/0202927 | A1* | 8/2007 | Pfleging | H04W 4/90 |
| | | | | 455/567 |
| 2009/0023425 | A1* | 1/2009 | Hosain | H04M 3/5116 |
| | | | | 455/412.1 |
| 2010/0241312 | A1* | 9/2010 | Preston | H04L 41/0809 |
| | | | | 455/414.1 |
| 2013/0157611 | A1* | 6/2013 | Small | H04W 76/50 |
| | | | | 455/415 |
| 2025/0146831 | A1* | 5/2025 | Okada | G01C 21/3626 |

* cited by examiner

FIG. 4

INTELLIGENT CALL QUEUE PRIORITIZATION BASED ON VEHICULAR DATA RETRIEVAL

INTRODUCTION

Vehicles are rapidly integrating ever increasing technological components into their systems. Special use microcontrollers, technologies, and sensors may be used in many different applications in a vehicle. Automotive microcontrollers and sensors may be utilized in enhancing automated structures that offer state-of-the-art experience and services to the customers, for example in tasks such as body control, camera vision, information display, security, autonomous controls, etc. Further, functions such as automated call assistance may be used in situations where a vehicle or its occupants may need assistance.

When a person in a vehicle calls an organization's customer service, either via a phone, e.g., cellular, or through a vehicle's on-board communication system, the caller may often be placed into a call hold queue. Depending upon factors such as time of day, number of calls in the queue, number of service representatives, it may involve a long wait time to speak with the service representative. Further, even when the person is able to speak with a service representative, the information the person may convey may not be sufficient or accurate enough to properly respond to the situation. Accordingly, it is desirable to obtain non-verbal accurate information relating to the situation from callers who may need or benefit from expedited assistance.

SUMMARY

Disclosed herein is an on-hold priority queuing system based on data retrieved from a vehicle. As disclosed herein, a communication may be initiated from a vehicle and received at a back office, or enterprise system. A determination may be made that additional information may be needed to prioritize and classify the nature of the received call. If additional information is needed the vehicle may then be contacted to retrieve additional information stored within the vehicle. The process may continue as additional updated information becomes available, thus allowing for a classification and prioritization analysis to assess the situation.

Thus, a system for determining a priority of a call in an on-hold queue may include a vehicle equipped with an integrated communication device and a server, that is in communication with the integrated communication device whereby data may be exchanged between the server and the integrated communication device. Further, the server may include a call manager system that may determine a priority of the call in an on-hold queue of the call manager. The priority of the call in the on-hold queue may be determined based on the data received from the integrated communication device, where the received data may include at least a type of call, account information associated with the vehicle, data associated with the vehicle, and a location of the vehicle.

Another aspect of the disclosure may include where the type of call includes an assistance call, an emergency call, or an automatic call triggered by a condition of the vehicle.

Another aspect of the disclosure may include where the account information includes at least customer data, customer history, and waiting time in the on-hold queue of the call manager.

Another aspect of the disclosure may include where the vehicle data includes at least a model, an occupancy data, and a motion status of the vehicle.

Another aspect of the disclosure may include where the location of the vehicle includes at least a global positioning system (GPS) coordinate.

Another aspect of the disclosure may include where the GPS coordinate is associated with a crisis area or a flood zone.

Another aspect of the disclosure may include where the data received from the integrated communication device further includes a diagnostic trouble code that is retrieved from a control module of the vehicle.

Another aspect of the disclosure may include where the data received from the integrated communication device further includes a battery status or a signal strength of a signal received from the integrated communication device.

Another aspect of the disclosure may include where the vehicle may initiate a data exchange with the server based on an updated data of the type of call, the account information associated with the vehicle, the vehicle data, the location of the vehicle, or a diagnostic trouble code.

Another aspect of the disclosure may include a method determining a priority of a call in an on-hold queue that includes receiving, at an enterprise, the call from a vehicle with an integrated communication device. The method may include placing the call into the on-hold queue and receiving, at the enterprise, data from the vehicle with the integrated communication device, where the data may include at least a type of call, an account information associated with the vehicle, a vehicle data, and a location of the vehicle. Further, the method may include determining, at the enterprise, the priority of the call in the on-hold queue based on the data received from the vehicle with the integrated communication device.

Another aspect of the method may include where the type of call includes an assistance call, an emergency call, or an automatic call triggered by a condition of the vehicle.

Another aspect of the method may include where the account information includes at least customer data, customer history, and waiting time in the on-hold queue of the call manager.

Another aspect of the method may include where the vehicle data includes at least a model, an occupancy data, and a motion status of the vehicle.

Another aspect of the method may include where the location of the vehicle includes at least a global positioning system (GPS) coordinate.

Another aspect of the method may include determining if the GPS coordinate is associated with a crisis area or a flood zone.

Another aspect of the method may include retrieving a diagnostic trouble code from a control module of the vehicle.

Another aspect of the method may include where the data received from the integrated communication device further includes a battery status or a signal strength of a signal received from the integrated communication device.

Another aspect of the method may include receiving, at the enterprise, an updated data of the type of call, the account information associated with the vehicle, the vehicle data, the location of the vehicle, or a diagnostic trouble code.

Another aspect of the method may include revising the priority of the call in the on-hold queue based on the updated data received from the vehicle with the integrated communication device.

Another aspect of the disclosure may include a method for determining a priority of a call in an on-hold queue including initiating the call, to an enterprise, from a vehicle with an integrated communication device. The method may include where the call is placed into the on-hold queue and sending data, to the enterprise, from the vehicle with the integrated communication device. The data may include at least a type of call, an account information associated with the vehicle, a vehicle data, and a location of the vehicle. Further, the method may include determining, by the enterprise, the priority of the call in the on-hold queue based on the data sent by the vehicle with the integrated communication device.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
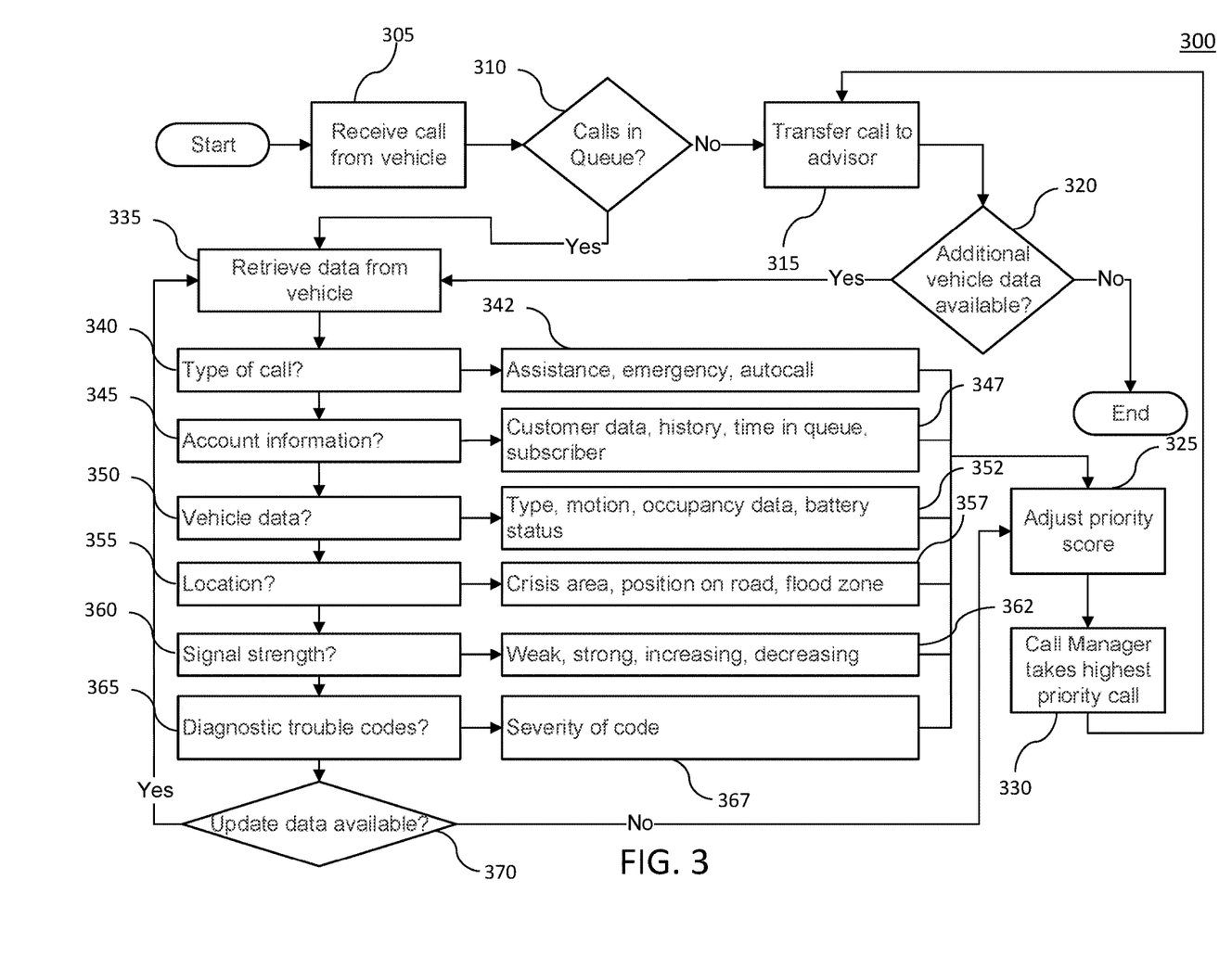
FIG. 3 is a detail flowchart of a system for determining a priority of a call in an on-hold queue, in accordance with the disclosure.

Referring to the drawings, the left most digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110a" and "110b" may indicate two different input devices which may be functionally the same, but may be located at different points in a simulation arena).

Vehicles have become computationally advanced and equipped with multiple microcontrollers, sensors, and control systems, including for example, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and rear automatic braking may depend on information obtained from cameras and sensors on a vehicle. Such systems may also provide a wealth of information of the vehicle, including, for example, location, automatic assistance sensors, occupancy data, motion sensors, to name a few. These systems may also provide detailed data as to the operation of a vehicle, knowledge that may not be familiar to its occupants. Such information may be combined with remote databases, for example at an enterprise or back-office operation, to provide additional insight into a vehicle's situation and status. For example, a vehicle global positioning system can pinpoint a vehicle's location. That information, in conjunction with real-time traffic information from third party sources may indicate that a vehicle is stopped on a highway with no traffic. Or, the opposite, that the vehicle is stopped in a high-risk crisis area on a busy highway in high-speed lane.

Figure 1:
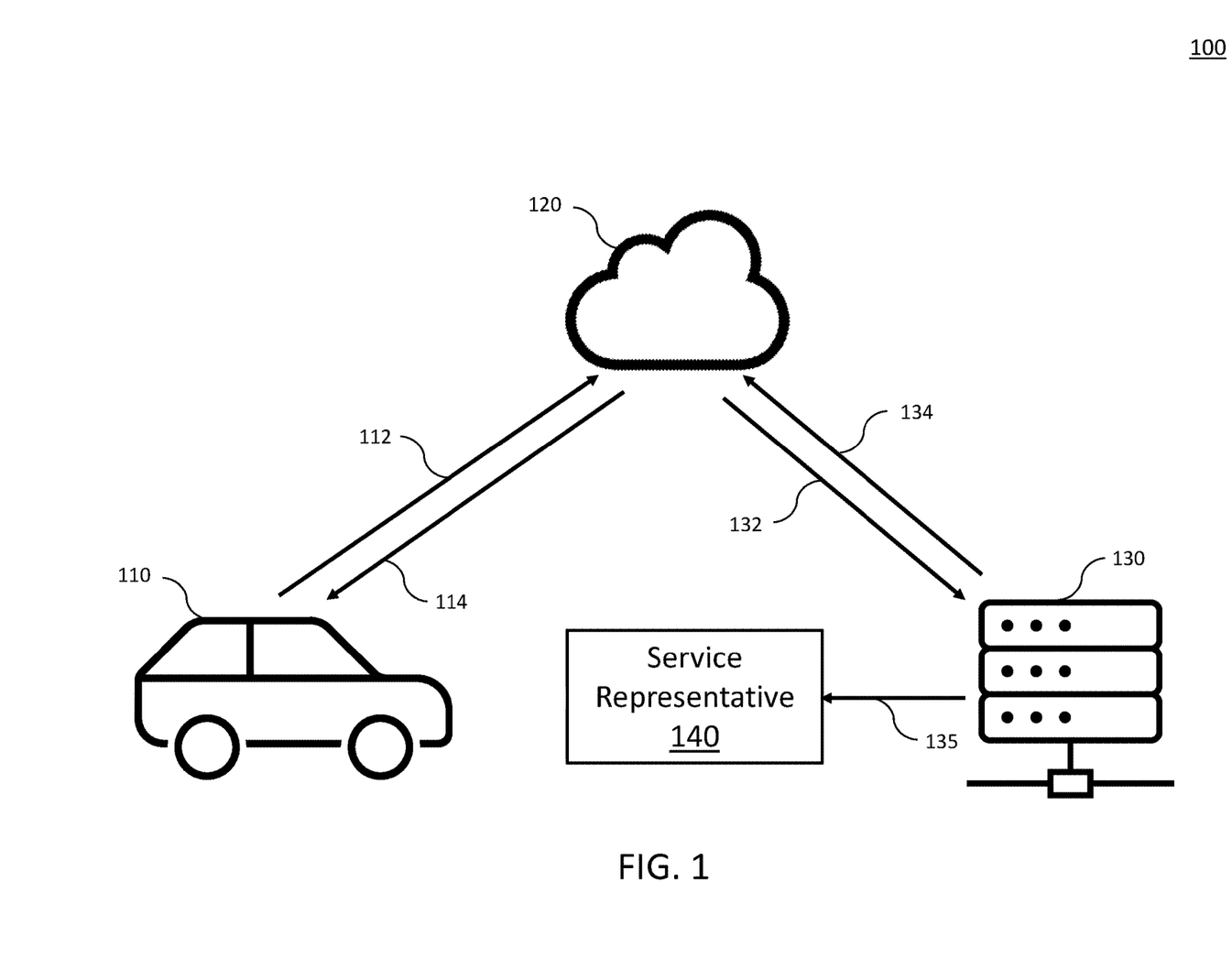
FIG. 1 is an illustration of a through the cloud, in accordance with the disclosure.

FIG. 1 is an illustration of an enterprise system 100 for call assistance, according to an embodiment of the present disclosure. System 100 may include a vehicle 110, an internet 120, and a back-office server system 130, which may also be referred to within this disclosure as an enterprise. In the event of a situation with vehicle 110, an integrated communications device within vehicle 110 may initiate a communication 112 through the internet 120 and to the back-office server system 130 through a received communication 132. The communication 112 may have been initiated by vehicle 110 automatically due to some type of incident involving vehicle 110. In another embodiment, communication 112 may have been initiated by an action of an occupant from within vehicle 110. In yet another embodiment, communication 112 may have been initiated by a person using a communication device independent of the vehicle 110.

Back-office server system 130 may also include a call manager that may be capable of prioritizing incoming calls, such as communication 132. Priority may be given to calls based on a variety of factors. For example, the longer the call has been in an on-hold queue the higher its priority. Priority may also be given to a call based on data associated with the vehicle 110. For example, if vehicle 110 is not moving and is located on a highway, priority may be given to that call. However, if the call was automatically generated by vehicle 110 or if the call was initiated by a person and that person is incapacitated or not able to determine information such as their exact location, then the back-office server system 130 may initiate a query back to the vehicle 110 to obtain additional information. For example, back-office server system 130 may initiate a query by sending a communication 134 through the internet 120 and back through communication 114 to the vehicle 110. The query may consist of requesting one or more pieces of data stored by the vehicle 110. The data stored by the vehicle may consist of information related to vehicle 110 such as the type of vehicle, e.g., a sedan, a truck, 2 wheel or 4-wheel drive, and the query may also request vehicle operational data, e.g., fuel level, number of occupants, speed, location, or a number of other data stored by the vehicle.

The requested data may then be sent back to the back-office server system 130, for example via communication 112, internet 120, and communication 132. Once received, a call manager within the back-office server system 130 may prioritize the calls, and ultimately send calls to a service representative 140 via link 135.

Figure 2:
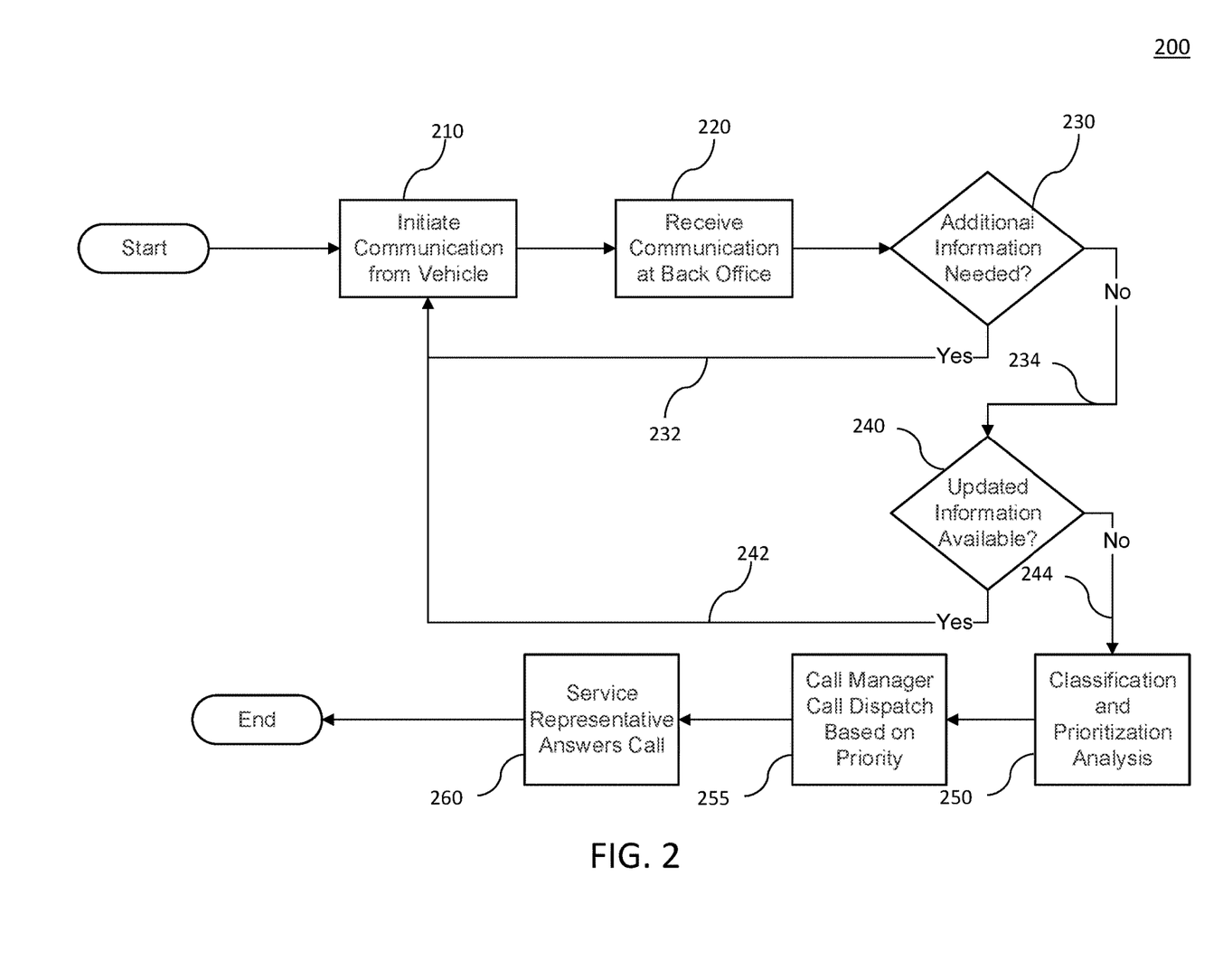
FIG. 2 is a high-level flowchart of a system for determining a priority of a call in an on-hold queue, in accordance with the disclosure.

FIG. 2 is a flow chart of a system 200 for determining a priority of a call in an on-hold queue, according to an embodiment of the present disclosure. The flow chart starts with step 210 where a communication is initiated from the vehicle. As discussed in FIG. 1, the communication may, in some instances, be initiated by the vehicle automatically without user intervention. In some instances, the communication may be initiated by a person activating an integrated communication device within the vehicle. At step 220 the communication generated in step 210 may be received at the back office, for example the back-office server system 130. At step 230 the back office may determine if additional information from the vehicle is needed. If information is needed, then the back office may generate a query to the vehicle requesting specific information via a link 232 that is directed back to step 210 to request that the vehicle initiate another communication session with the back office to provide the requested information. However, if at step 230 the back office determines that no additional information may be needed, then link 234 is directed to step 240. At step 240, if additional information becomes available, for example movement of the vehicle resulting in a location change of the vehicle, then link 242 is directed back to step 210 to request additional information from the vehicle.

At step 240 when it may be determined that no additional information is available then link 244 is directed to step 250 where the back office may perform a classification and prioritization analysis on the available information. The classification and prioritization analysis may include a scoring algorithm so that a priority may be assigned to each call. For example, a scoring algorithm may include the following example that may calculate a confidence level and threshold, where certain account attributes and real-time vehicle parameters may be analyzed to triage a call queue such that assistance may be provided sooner in situations that may warrant expedited handing:

- If new call, Priority Score=x where x=call type (e.g., blue button, thermal runaway, emergency); otherwise, stored Priority Score of call is used
- Look up account information
- If current customer, Priority Score+1
- Look up profile information and pull occupancy data from vehicle
- If family members or pets listed and occupancy data shows present, Priority Score+1
- Look up previous calls within last x minutes
- If customer has called for an emergency purpose (evac route, tow truck, etc.), Priority Score+2
- Look up crisis data for area of caller
- If crisis present, Priority Score+2
- Determine if vehicle is stopped on highway with no traffic
- If so, Priority Score+2
- Determine type of vehicle
- If crisis present and type of vehicle adds risk, Priority Score+3
- Pull Diagnostic Trouble Codes (DTC) from Control Modules
- If in crisis area and DTCs present, Priority Score+3
- Look up Public Safety Answering Points average response time in area
- If in crisis area and average response time>threshold, Priority Score+3
- Call been in queue for x secs?
- If call in queue for more than 60 sec interval, Priority Score+2
- Look up customer loyalty data
- If subscription data is >threshold, Priority Score+2
- Look up frequency of use for customer
- If frequency of use meets criteria, Priority Score+2

The above algorithm is presented as an example algorithm and is not meant to be inclusive or limiting. The example algorithm illustrates the concept of combining vehicle data, third party data, and customer account data in real-time to assist in determining an on-hold call priority. At step 255 the priority and classification analysis, for example as presented in the example algorithm may order the on-hold calls, passing the highest priority calls out of the queue and in step 260 passing that call to a service representative.

FIG. 3 is a flow chart of a system 300 for determining a priority of a call in an on-hold queue, according to an embodiment of the present disclosure. FIG. 3 details possible categorizations of data that may be retrieved from a vehicle. The flow chart of system 300 starts with step 305 where a call is received from a vehicle, for example by back-office server system 130 from vehicle 110. At step 310 a determination may be made as to whether there are calls in an on-hold queue, for example through the use of a call manager in the back-office server system 130. If there are no calls in the queue, then at step 315 the call may be transferred to an advisor or service representative. However, at step 320 if additional vehicle data is required, requested, or available, then the additional data may be retrieved at step 335 from the vehicle.

Steps 340, 345, 350, 355, 360, and 365 illustrate some possible data categorizations that may be used in a priority analysis based on data retrieved from the vehicle. At step 340 the type of call may be determined. For example, at step 342 the call may be determined to be for assistance. For example, roadside assistance for a flat tire, dead battery, empty fuel, etc. Or the call may be classified as an emergency. For example, an incident where an occupant determines that assistance is need, possibly not-life threatening, but of a serious nature. Or, the call may be automatically generated, for example in the case of air-bag deployment or where sensors indicate an incident.

At step 345, account information regarding an owner or operator of the vehicle may be used for call prioritization. For example, based on a vehicle's identification number, e.g., Vehicle Identification Number (VIN) that may be received by the back-office server system 130 from the vehicle. The back-office server system 130 may then correlate the VIN number with account information at step 347, for example customer data, historical customer data, the amount of time the call has been in the queue or other subscriber data. For example, if the customer has subscribed to a particular service that gives them priority access or access to additional services, then that call may be given a higher priority in the queue. The account information may be maintained within back-office server system 130 or from the cloud or a third-party source. In such cases, the back-office server system 130 may retrieve such data from the appropriate source.

At step 350, specific vehicle data may be used for prioritization. For example, the type of vehicle at step 352 may determine an appropriate response. For example, if the vehicle is a Battery Electric Vehicle (BEV) then prioritizing a roadside assistance vehicle with gasoline may not be appropriate. In addition, especially it the vehicle is a BEV then battery status becomes a critical piece of information. A large sports utility vehicle (SUV) may be more resilient to possible flooding in a flood plane versus a small compact vehicle. Further, the motion of a vehicle may also be pertinent to prioritization. If the vehicle is stopped and located in a parking lot versus moving on a highway may determine the priority of contact with a service representative. Occupancy data may also be pertinent. For example, if the vehicle has a driver as being a single occupant versus a 15-passenger van may determine an appropriate response. The vehicle may determine by various sensors, e.g., seat belt connections, the number of occupants.

At step 355, location data of the vehicle at step 357 may be an important aspect to determine the priority of a call for assistance. For example, using GPS data from the vehicle the back-office server system 130 may further determine a situational awareness. For example, using the GPS location and real-time traffic and mapping data, the current driving conditions may further be determined. For example, the position of the vehicle on the road, e.g., on the shoulder, at a rest stop, in a parking lot, or in the middle of oncoming traffic. Further, is the vehicle in a flood zone and real-time weather may be predicted flash floods are data elements that may be available to assess a situation and severity thus determining a priority of a call for assistance.

At step 360, signal strength of the received signal from the vehicle is analyzed. At step 362 the back-office server system 130 may analyze the signal strength status. For example, is the signal weak and therefore may have the possibility of loss of communication or is it decreasing, also indicating a possible loss of communication. Conversely, if the signal is strong or increasing in strength then there may be less of a concern of a loss in communication.

At step 365 the vehicle may provide diagnostic trouble codes. Diagnostic trouble codes may be generated by a vehicle's on-board diagnostic systems wherever a fault is detected. Diagnostic trouble codes may provide information pertaining to various system throughout a vehicle, such as the powertrain, chassis, body, and the vehicle's onboard computers and related systems. Depending upon the severity of a diagnostic trouble code at step 367 the priority of a call may be adjusted.

At step 370 there may be a determination or inquiry to the vehicle if an update of data is available. If updated data is available then that data may be retrieved from the vehicle and further analyzed in steps 340, 342, 345, 347, 350, 352, 355, 357, 360, 362, 365, and 367. This loop may be repeated until there is no longer updated data available, and at which point an adjustment of a priority score may be done at step 325.

At step 330 a call manager may select the highest priority call from an on-hold queue and at step 315 transfer that call to an advisor or service representative. At step 320 the service representative may determine that some additional data may be needed from the vehicle, in which case at step 335 that additional data may be retrieved from the vehicle and processed as just described. If the service representative does not need additional data, then at step 320 the flow may then conclude for that call.

Figure 4:
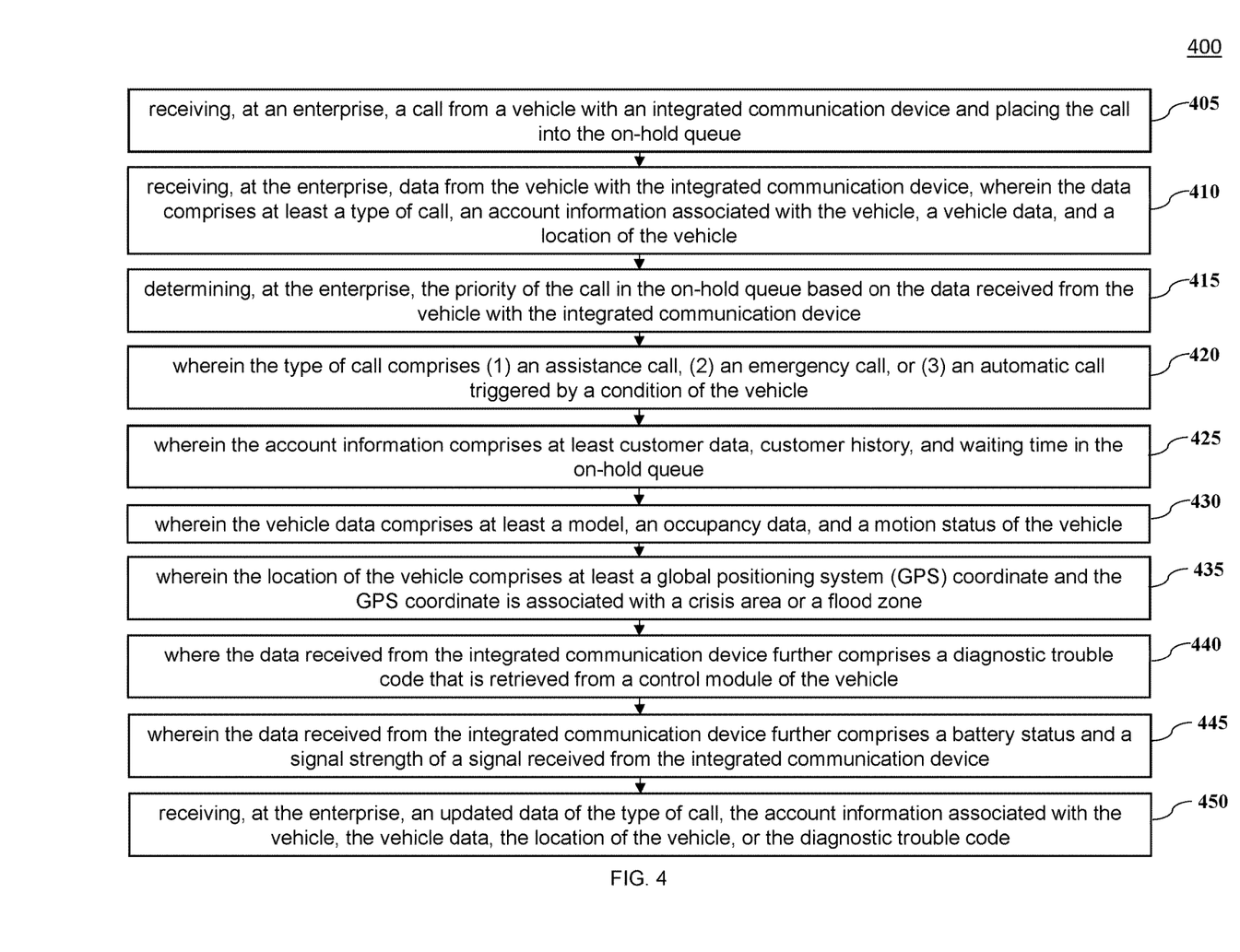
FIG. 4 depicts a flowchart of a method for determining a priority of a call in an on-hold queue, in accordance with the disclosure.

FIG. 4 shows an exemplary embodiment of a method determining a priority of a call in an on-hold queue, according to an embodiment of the present disclosure. Method 400 begins at step 405 with a receiving of a call from a vehicle at an enterprise where the enterprise may be a back-office operation that would include, for example, a back-office server system 130. In addition, the back-office server system 130 may also contain a call manager system that may be used to manage the incoming calls, for example including placing the call into an on-hold queue. Step 405 may also include where the vehicle includes an integrated communication device that allows for communications between the vehicle and the enterprise.

At step 410 the enterprise may also receive data from the vehicle through the integrated communication device in which the data may include multiple categories of data. For example, the data may include a type of the call, account information associated with the vehicle, vehicle data, and a location of the vehicle. For example, given the VIN number of the vehicle that is associated with a title of the vehicle that may include an owner's name. Given the owner's name an associated account may be identified that may indicate the owner has subscribed to some type of subscription service offered by the vehicle's manufacturer.

At step 415 the enterprise, or as discussed, the back-office server system 130 and call manager may determine a priority of the call in the on-hold queue based on the data received from the vehicle with the integrated communication device. As discussed, a priority of the call may also be based, in addition to the data received from the vehicle from other data associated with data from the vehicle. For example, given a location of the vehicle a number of other factors may also be determined. For example, the type of road the vehicle may be travelling on, or the real-time traffic conditions surrounding the vehicle. In addition, if the vehicle's location continues to change then it may be determined what direction the vehicle is traveling and may also, based on those factors, modify a priority of the call.

At step 420 the type of call may further be defined. For example, the type of call may be classified as an assistance call, an emergency call, or an automatic call that may have been triggered by a condition of the vehicle. As discussed, vehicles may include numerous sensors and processors that may determine if certain type of events have occurred. For example, if a sensor in a BEV suddenly detects a rise in temperature of the batteries, the vehicle may initiate an automatic call for assistance.

At step 425 the account information discussed in step 410 may include more detailed information such as customer data, e.g., the owner of the vehicle may be a subscriber to a service offered by the manufacturer. The account information may also include a customer history such as the vehicle owner has subscribed to a particular service for over five years and thus may be given a higher priority in the queue. Further, the account information may also include the waiting time in the queue as the vehicle may have logged when the call was placed and is knowledgeable of the current time.

At step 430 the vehicle data discussed in step 410 may include more detailed information, for example vehicle data may include the model of the vehicle. As discussed, the vehicle may be a BEV that may require different responses for assistance. Further, a SUV may necessitate a different priority for an assistance call than a compact car where the vehicle may be located in a flood plane. The vehicle data may also include occupancy data. For example, how many occupants are in the vehicle, especially if services may be dispatched to assist in the case of a medical necessity. Vehicle data may also include a motion status. For example, the vehicle is stationary, or the vehicle is travelling at an excessive speed. The motion status may also include directional information, for example the vehicle is traveling the wrong direction on a one-way street.

At step 435 the location of the vehicle discussed in step 410 may include more detailed information, for example the location of the vehicle may include a GPS coordinate and that GPS coordinate may be associated with a particular environment. For example, the GPS coordinate may be associated with a high-crime area. The fact that a particular coordinate is associated with a high-crime area may be derived from the use of third-party databases, for example a police crime database. Or, as another example, the area in which the vehicle is located may be classified as a flash flood zone. That information coupled with the type of vehicle may result in a change in priority level for an associated call in the on-hold queue.

At step 440 the data received from the integrated communication device in the vehicle may further comprise a diagnostic trouble code. Diagnostic trouble codes may vary by manufacturer of the vehicle but can provide a wealth of operational information. Diagnostic trouble codes may be retrieved from various control modules within a vehicle. For example, an engine control module (ECM) or a body control module (BCM). Further, as vehicles continue to evolve and include ever more processing power, a control module is meant to refer to modules and processors throughout a vehicle that may contain operational data.

At step 445 the data received from the integrated communication device may also include a battery status and a signal strength of a signal received from the integrated communication device. For example, battery status may include a voltage level of a battery, or it may be a temperature of a battery. In a BEV the battery status may include a low battery charge warning indication. Especially in a BEV, a battery may be damage if overcharged and each cell voltage may be monitored and controlled, thus battery status information may include factors such as cell leakage current, overvoltage, undervoltage, etc. Further, a signal strength of the signal from the integrated communication device may be used to alert the enterprise to a possible loss of communications if the signal strength is decreasing and therefore may place a higher priority on the call.

At step 450 the enterprise may receive an updated data of the type of call, account information associated with the vehicle, vehicle data, location of the vehicle, or the diagnostic trouble code. Step 450 is directed to possible updating of information within the vehicle that may be transmitted to the enterprise. Changes in information stored in the vehicle may provide additional information to a service representative especially if the change in information indicates a critical change in the situation of the vehicle and its occupants. Thus, step 450 may be an iterative process that may be repeated multiple times.

Method 400 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A system for determining a priority of a call in an on-hold queue comprising:
    a vehicle comprising an integrated communication device configured to initiate the call;
    a server, communicatively coupled to the integrated communication device, configured to exchange data between the server and the integrated communication device; and
    the server, further comprising a call manager configured to determine the priority of the call;
    wherein the priority of the call in the on-hold queue is determined based on the data received from the integrated communication device;
    wherein the data received from the integrated communication device comprises at least a type of call, an account information associated with the vehicle, a vehicle data, and a location of the vehicle; and
    wherein the vehicle data comprises at least a model, an occupancy data, and a motion status of the vehicle.

2. The system of claim 1, wherein the type of call comprises an automatic call triggered by a condition of the vehicle.

3. The system of claim 1, wherein the account information comprises at least customer data, customer history, and waiting time in the on-hold queue of the call manager.

4. The system of claim 1, wherein the location of the vehicle comprises at least a global positioning system (GPS) coordinate.

5. The system of claim 4, wherein the GPS coordinate is associated with a crisis area or a flood zone.

6. The system of claim 1, where the data received from the integrated communication device further comprises a diagnostic trouble code that is retrieved from a control module of the vehicle.

7. The system of claim 1, wherein the vehicle is a Battery Electric Vehicle (BEV), and wherein the data received from the integrated communication device further comprises a battery status of the BEV.

8. The system of claim 1, wherein the vehicle is configured to initiate a data exchange with the server based on: an updated data of the type of call, the account information associated with the vehicle, the vehicle data, the location of the vehicle, or a diagnostic trouble code.

9. A method for determining a priority of a call in an on-hold queue comprising:
receiving, at an enterprise, the call from a vehicle with an integrated communication device;
placing the call into the on-hold queue;
receiving, at the enterprise, data from the vehicle with the integrated communication device, wherein the data comprises at least a type of call, an account information associated with the vehicle, a vehicle data, and a location of the vehicle, and wherein the vehicle data comprises at least a model, an occupancy data, and a motion status of the vehicle; and
determining, at the enterprise, the priority of the call in the on-hold queue based on the data received from the vehicle with the integrated communication device.

10. The method of claim 9, wherein the type of call comprises an automatic call triggered by a condition of the vehicle.

11. The method of claim 9, wherein the account information comprises at least customer data, customer history, and waiting time in the on-hold queue.

12. The method of claim 9, wherein the location of the vehicle comprises at least a global positioning system (GPS) coordinate.

13. The method of claim 12, further comprising determining if the GPS coordinate is associated with a crisis area or a flood zone.

14. The method of claim 9, further comprising retrieving a diagnostic trouble code from a control module of the vehicle.

15. The method of claim 9, wherein the vehicle is a Battery Electric Vehicle (BEV), and wherein the data received from the integrated communication device further comprises a battery status of the BEV.

16. The method of claim 9, further comprising receiving, at the enterprise, an updated data of the type of call, the account information associated with the vehicle, the vehicle data, the location of the vehicle, or a diagnostic trouble code.

17. The method of claim 16, further comprising revising the priority of the call in the on-hold queue based on the updated data received from the vehicle with the integrated communication device.

18. A method for determining a priority of a call in an on-hold queue comprising:
initiating the call, to an enterprise, from a vehicle with an integrated communication device, wherein the call is placed into the on-hold queue; and
sending data, to the enterprise, from the vehicle with the integrated communication device, wherein the data comprises at least a type of call, an account information associated with the vehicle, a vehicle data, and a location of the vehicle,
wherein the enterprise determines the priority of the call in the on-hold queue based on the data sent by the vehicle with the integrated communication device; and
wherein the vehicle data comprises at least a model, an occupancy data, and a motion status of the vehicle.

* * * * *